3,840,530
METALLIZED ISOCYANIDES AND
THEIR REACTIONS

Ulrich Schoellkopf, Bovenden, and Fritz Gerhart, Gottingen, Germany, assignors to Badische Anilin- & Soda-Fabrik Aktiengesellschaft, Ludwigshafen (Rhine), Germany
No Drawing. Original application Oct. 20, 1969, Ser. No. 867,941, now Patent No. 3,712,911, dated Jan. 23, 1973. Divided and this application Nov. 6, 1972, Ser. No. 304,240
Claims priority, application Germany, Dec. 2, 1968,
P 18 12 099.5
Int. Cl. C09b 23/14
U.S. Cl. 260—240 D                          15 Claims

ABSTRACT OF THE DISCLOSURE

α-Metallized isocyanides containing the radical

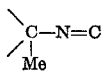

as an essential portion of the molecule, wherein Me stands for alkali or an equivalent of magnesium, zinc or cadmium, and their use as intermediates in the manufacture of olefins, amino acids and $\Delta^2$-oxazolines.

---

This application is a divisional application of application Ser. No. 867,941, filed Oct. 20, 1969, now U.S. Pat. No. 3,712,911, issued Jan. 23, 1973.

This invention relates inter alia to new compounds, viz isocyanides metallized in the α-position, which open up new possibilities for organic synthesis and therefore have outstanding importance as intermediates for such reactions, for example for the manufacture of olefins, amino acids and heterocycles. The invention also relates to the manufacture of the said α-metallized isocyanides, which are also referred to as isonitriles or carbylamines.

The new compounds have the general formula

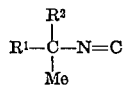

where $R^1$ and $R^2$ may be identical or different and each denotes hydrogen and/or an inorganic or organic radical such as may occur in isocyanides, and Me is alkali, magnesium, zinc or cadmium.

$R^1$ and $R^2$ may be for example hydrogen, saturated or unsaturated aliphatic or cycloaliphatic hydrocarbon radicals or aromatic-aliphatic, aliphatic-aromatic, aromatic or heterocyclic radicals. The radicals themselves may be substituted by hydroxyl, alkoxy, ROOC—, ROC—, isonitrile or nitrile groups or by halogen. Aliphatic radicals are for example alkyl radicals such as methyl, ethyl, propyl or butyl. Examples of unsaturated aliphatic radicals are alkenyl radicals such as propylene or isoprenoid radicals. Other unsaturated aliphatic radicals for the purposes of the above general formula are for example alkynyl radicals, such as the radical of acetylene. An aromatic radical is for example phenyl which may be substituted, e.g. by alkyl groups.

Examples of heterocyclic radicals are pyridyl and furyl.

$R^1$ may moreover denote substituents or groups such as alkoxy, aroxy, metaloxy, halogen, nitrile, alkylmercapto, arylmercapto, dialkylamino, ROOC—, ROC—, carboxylate, phosphinoxy, phosphonate or phosphonium. $R^2$ may have the same meaning as long as the resultant compound has a realizable structure. Those skilled in the art after reading the present specification will have no difficulty in deciding whether any starting material (an isocyanide having the above formula, but hydrogen in place of Me) is suitable, so that no further explanations need be given.

Another possibility is for $R^1$ and $R^2$ to jointly form an alkylidene radical, as in the compound

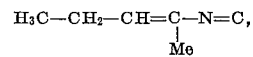

or to denote a carbocyclic radical together with the alpha carbon atom of the isocyanide, as in cyclohexyl isocyanide.

The radicals R in the ROOC— and ROC— groups may in principle have the same meanings as the radicals $R^1$ and $R^2$. In ROOC—R may also be a metal ion (Me) and in α-ROC— hydrogen.

Me in the first-mentioned general formula stands for alkali metal, i.e. lithium, sodium or potassium, or an equivalent of magnesium, zinc or cadmium.

As can be seen from the details given above, the metallized isocyanides of this invention constitute a new class of compounds characterized by the

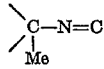

portion of the molecule.

Examples of individual compounds of this class are α-metal methyl isocyanide, α-metal ethyl isocyanide, α-metal isopropyl isocyanide, α-methyl cyclopropyl isocyanide, α-metal cyclopentyl isocyanide, α-metal cyclohexyl isocyanide, α-metal allyl isocyanide, α-metal crotyl isocyanide, α-metal methallyl isocyanide, α-metal pentadien-2,4-yl isocyanide, α-metal benzyl isocyanide, α-metal furfuryl isocyanide, α-metal-2-pyridyl methyl isocyanide, α-metal ethynyl methyl isocyanide, α-metal vinyl isocyanide, α-metal ethoxymethyl isocyanide, α-metal phenoxymethyl isocyanide, α-metal ethylmercaptomethyl isocyanide, α-metal phenylmercaptomethyl isocyande, α-metal dimethylaminomethyl isocyanide, ethyl α-metal isocyanoacetate, ethyl α-metal α-isocyanopropionate, α-metal α-isocyanoacetone, α-metal α-isocyanoacetophenone and α-metal isocyanoacetonitrile.

The metallized isocyanides may be obtained by treating isocyanides bearing at least one hydrogen atom on the alpha carbon atom with a metallizing agent. Metallizing agents are especially basic agents of the type MeX where Me is an equivalent of one of the said metals and X an aliphatic or aromatic hydrocarbon radical, the radical of an alcohol or acetylenic compound, or OH. Metallizing agents therefore include organometallic compounds, alcoholates, acetylides, hydroxides and Grignard compounds. Metal hydrides and metal amides may also be successfully used, and in some cases the isocyanides can be reacted direct with a metal to form metallized isocyanides.

Examples of metallizing agents are butyllithium, phenyllithium, phenylsodium, sodium methylate, sodium ethylate, potassium tert-butylate, lithium tert-butylate, potassamide, sodium acetylide, phenyl magnesium bromide, magnesium hydroxide, sodium hydride, sodamide and sodium metal.

It goes without saying that the radicals $R^1$ and $R^2$ in the starting materials

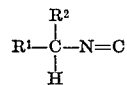

and any substituents of $R^1$ and $R^2$ should not interfere with the substitution of the metal for the hydrogen atom or the alpha carbon atom. Although the manufacture of the α-metallized isocyanides and the metallized isocyanides themselves are new, those skilled in the art having read the present detailed disclosure will, thanks to their general chemical knowledge, have no difficulty in distinguishing in the starting materials those radicals and substituents that would interfere with or even prevent metallization in all circumstances or when using particular metallizing agents.

Metallization is carried out in a liquid medium, i.e. one which is liquid during the metallization. The medium should be inert to the metallizing agent and not interfere with the metallization. Preferred liquids are therefore hydrocarbons, such as ligroin or benzene, ethers, such as diethyl ether or tetrahydrofuran, dimethylformamide, dimethylsulfoxide, acetonitrile, and if desired alcohols, such as methyl or ethyl alcohol. Mixtures of the said liquids may also be used. Those skilled in the art having read the present specification will have no difficulty in selecting further liquids suitable as reaction media.

Unmetallized isocyanides may be obtained by the method of Ugi and coworkers, Angew. Chem., 77, 492 (1965); International Ed., 4, 472 (1965).

The reaction temperature may be varied within a wide range. In general, temperatures below —80° C. and above +80° C. are of no industrial importance; temperatures below or around room temperature are preferred.

Compounds that are sensitive to atmospheric oxygen are conveniently reacted under nitrogen.

It is preferred to use stoichiometric amounts of isocyanide and metallizing agent, although in many cases the reaction will more readily proceed to completion if an excess of metallizing agent is used.

There are various possibilities of following the progress of metallization. While in some cases color changes can be observed, the metallized isocyanides sometimes occur as precipitates in the reaction mixture. Occasionally the completeness of metallization can be ascertained by the negative Gilman test. Deuteration can also be used to show the formation of metallized isocyanide. The said methods are well known to those skilled in the art. The metallized isocyanides can immediately be used for further reactions in the form of the reaction mixture, they may however be isolated, e.g. by evaporation of the liquid phase, i.e. the liquid used as the solvent.

α-Metallized isocyanides according to the present invention have numerous applications. They may for example be used for producing olefins by reacting them with carbonyl compounds according to the equation:

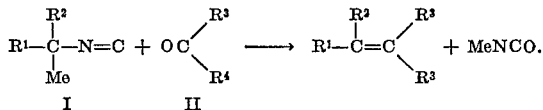

The α-metallized isocyanides are represented by formula I where $R^1$ and $R^2$ may be identical and denote hydrogen and/or inorganic and/or organic radicals such as may occur in isocyanides, and Me stands for alkali, i.e. lithium, sodium or potassium or an equivalent of magnesium, zinc or cadmium.

The compounds of formula II are aldehydes or ketones, and the radicals $R^3$ and $R^4$, which may be identical or different, denote hydrogen or organic radicals such as may occur in aldehydes or ketones.

As regards the reaction of the metallized isocyanide with a carbonyl compound reference is made to the details given above for the manufacture of the metallized isocyanide.

For the manufacture of olefins the same reaction mixture may be used in which the α-metallized isocyanide has been prepared. The metallized isocyanide may however first be isolated, e.g. by evaporation of the solvent termed liquid medium. An alternative method is for example to add the isocyanide and component II, either simultaneously or in admixture, to a liquid containing metallizing agent. Component I, which is formed intermediately, reacts with component II to form the olefin. In some cases it is possible first to combine the carbonyl compound with the metallizing agent and only then to add the isocyanide.

The medium in which this reaction may be carried out is one which is inert to the reactants and does not interfere with the reaction. Preferred liquids in which the reaction may be carried out are hydrocarbons, such as ligroin or benzene, ethers such as diethyl ether, dioxane or tetrahydrofuran, dimethylformamide, dimethylsulfoxide, acetonitrile, and if desired alcohols, such as methyl or ethyl alcohol. Mixtures of the said liquids may also be used. Component II may also serve as reaction medium or solvent as long as it is liquid under the reaction conditions. In order to avoid yield losses the solvent used should be substantially anhydrous.

The reaction temperature may be varied within a wide range, but is usually between —80° and +80° C. In general, temperatures below or around room temperature are preferred. In many cases it may be expedient first to combine the reactants at a low temperature, e.g. at —80° to —40° C., and then to heat the mixture to room temperature and if desired for a few minutes or hours to a higher temperature up to about 80° C. or higher.

Compounds that are sensitive to atmospheric oxygen are conveniently reacted under nitrogen.

For economic reasons the reactants are used in stoichiometric amounts, but deviations of ±5% are not detrimental. Moreover, component II may be used as solvent provided it is liquid under the reaction conditions.

The solvent or liquid medium may be any of the liquids specified above for the manufacture of the metallized isocyanides.

With regard to the contacting of the two reactants no special explanations are required. Incidentally, various possibilities are outlined above.

The progress or end of the reaction may be ascertained by well-known physical or chemical methods, if one wishes to go beyond isolating the olefin formed. For isolation, the reaction mixture may be mixed with water and the olefin extracted with an organic solvent, or the organic solvent may first be removed by distillation and the metal isocyanate recovered from the residue. These and other methods are well known to those skilled in the art.

The reaction is particularly suited to the manufacture of olefins having conjugated double bonds, e.g. carotenoids.

The α-metallized isocyanides may also be used for the manufacture of Δ²-oxazolines by contacting them with carbonyl compounds at a temperature at which the 2-metallized Δ²-oxazolines intermediately formed from the two reactants are stable, replacing the metal in the metallized Δ²-oxazolines by allowing a protonating agent to act thereon, and then isolating the Δ²-oxazolines if desired.

The reaction may be represented by the following equation:

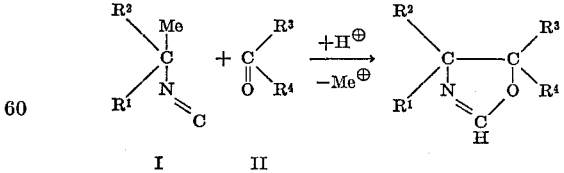

Formula I is the α-metallized isocyanide and $R^1$ and $R^2$ may be identical or different and each denotes hydrogen or an inorganic and/or organic substituent such as may occur in isocyanides, and Me stands for alkali, i.e. lithium, sodium or potassium, or for magnesium, zinc or cadmium.

Formula II is the carbonyl compound, i.e. an aldehyde or ketone. $R^3$ and $R^4$ may therefore be identical or different and denote hydrogen or organic radicals such as may occur in aldehydes or ketones.

The temperature range within which the initially formed 2-metallized Δ²-oxazoline is stable is usually from approx. —80° to approx. +60° C.

Protonating agents for the purposes of this reaction are substances capable of donating protons under the reaction conditions. Water is particularly suitable as a protonating agent. Alcohols, preferably water-soluble alcohols, such as methyl alcohol, ethyl alcohol, propyl alcohol and isopropyl alcohol, and phenols may also be used as protonating agents. Inorganic and organic acids are also useful, the former being preferably used together with water. Among organic acids water-soluble compounds such as formic acid and acetic acid are preferred. Other protonactive compounds, such as appropriate primary or secondary amines, ammonia, thioalcohols, thiocarboxylic acid or $CH$—acid compounds are also suitable.

Mixtures of the protonating agents with each other or with other liquids are also suitable.

The $\Delta^2$-oxazolines are produced by combining components I and II, if desired in the presence of a solvent, or component I may be prepared and component II added to the reaction mixture. The protonating agent is then allowed to act on the mixture. In some cases the unmetallized isocyanide may be added to the metallizing agent, either simultaneously or in admixture with component II, or component II may be mixed with the metallizing agent and the unmetallized isocyanide added to the mixture. Component I is then formed intermediately.

The solvent or liquid medium for this reaction may be any of the liquids specified above for the manufacture of the metallized isocyanides. Component II may also serve as solvent provided it is liquid under the reaction conditions. To avoid yield losses it may be advantageous for the solvent to be substantially anhydrous.

The $\Delta^2$-oxasoline may also be produced in the same reaction mixture in which the $\alpha$-metallized isocyanide has been prepared. The metallized isocyanide may however first be isolated, e.g. by evaporation of the solvent referred to as liquid medium.

For economic reasons the reactants are used in stoichiometric amounts, but deviations of up to a few percent are not detrimental. Moreover, component II may serve as solvent provided it is liquid under the reaction conditions.

Compounds that are sensitive to atmospheric oxygen are conveniently reacted under nitrogen.

The reaction mixture obtained after adding the protonating agent may be used direct in order to further process the $\Delta^2$-oxazoline contained therein, but it is also possible to process the reaction mixture in conventional manner and isolate the $\Delta^2$-oxazoline.

The said reaction provides a new and universally applicable route to the manufacture of both unsubstituted $\Delta^2$-oxazolines and $\Delta^2$-oxazolines substituted in the 4- and/or 5-position. Since the radicals $R^1$, $R^2$, $R^3$ and $R^4$ in the starting materials I and II can be varied within wide limits enabling the preparation of a great variety of $\Delta^2$-oxazolines, the further processing is of great scientific and industrial value. A large number of $\Delta^2$-oxazolines can now be prepared in a relatively simple and economic manner for biological (pharmaceutical or plant) tests or for use in pharmacy, plant protection or industry. Moreover, $\Delta^2$-oxazolines are valuable intermediates for the manufacture of aminoethanols (cf. Cornforth and Elderfield, Heterocyclic Compounds, V, p. 377).

For the reaction of the $\alpha$-metallized isocyanide to the olefin and also for the reaction to the $\Delta^2$-oxazoline $R^3$ and $R^4$ in the formula II may be not only hydrogen, but also unsaturated or saturated aliphatic or cycloaliphatic hydrocarbon radicals or aromatic radicals. They may in principle have the same meanings as $R^1$ and $R^2$ in formulae I. They may also, together with the carbonyl carbon, form a ring, as in cyclohexanone, or may be heterocyclic radicals, e.g. furyl, or may together form a heterocyclic radical.

Examples of radicals $R^3$ and $R^4$ are aliphatic radicals, particularly alkyl, cycloalkyl, alkenyl and unsaturated cycloalkyl such as methyl, ethyl, propyl, butyl, cyclohexyl, cyclooctyl, butene and cyclohexene. Phenyl is preferred as an aromatic radical $R^3$ or $R^4$. The said cyclic substituents may be attached to the carbonyl group either direct or via an aliphatic member, e.g. an alkane or alkene chain. The cyclic radicals may in turn be substituted for example by alkyl radicals.

The following examples illustrate the manufacture of various $\alpha$-metallized isocyanides. They do not limit the invention, but explain the principles of the new method for the manufacture of the organometallic compounds according to the invention. Supplementing the teaching of the above disclosure, the examples show methods of carrying out the invention.

EXAMPLE 1

0.30 mole n-butyllithium (198 ml., 1.25N solution in hexane) is added to 900 ml. dry tetrahydrofuran at —70° C. under nitrogen and then 12.3 g. (0.30 mole) methyl isocyanide is dripped in. Isocyanomethyllithium separates in the form of colorless crystals. Its presence is proved by adding cinnamaldehyde, 5-styryl-$\Delta^2$-oxazoline and phenylbutadiene being formed in a readily controllable reaction.

EXAMPLE 2

A solution of 50 mmoles n-butyllithium in 45 ml. pentane is diluted with 150 ml. dry tetrahydrofuran. 5.85 g. (50 mmoles) benzyl isocyanide is dripped into the mixture at —70° C. under nitrogen, the presence of $\alpha$-thiobenzylisonitrile being evidenced by an intensive red coloration. Metallization can also be proved by adding benzophenone, 1 - lithiumoxy - 2 - isocyano - 1,1,2 - triphenylethane or derivatives thereof being obtained.

EXAMPLE 3

2.8 g. (25 mmoles) potassium tert-butanolate is allowed to act for 10 minutes at room temperature on 2.9 g. (25 mmoles) benzylisonitrile dissolved in 10 ml. perdeuterated dimethylsulfoxide, $\alpha$-potassium benzyl isocyanide is formed which under the conditions used undergoes deuterolysis. 2.75 g. (95%) pure $\alpha,\alpha$-dideuterobenzyl isocyanide is isolated.

EXAMPLE 4

40 mmoles n-butyllithium (17 ml., 2.35N solution in pentane) is dripped at —60° C. into 5.64 g. (40 mmoles) tert-butyl isocyanoacetate in 40 ml. dry tetrahydrofuran under nitrogen. The formation of tert-butyl $\alpha$-lithioisocyanoacetate is evidenced by a yellow coloration. It can be proved by adding acetophenone, tert-butyl-2-lithiumoxy-1-isocyano-2-phenylpropane-1-carboxylic acid or a derivative thereof being formed.

EXAMPLE 5

A mixture of 2.825 g. (25 mmoles) ethyl isocyanoacetate and 2.65 g. (25 mmoles) benzaldehyde is dripped at room temperature into a solution of 0.6 g. sodium in 50 ml. ethanol. The ethyl $\alpha$-sodium isocyanoacetate intermediately formed combines with the benzaldehyde present to give ethyl 2-sodiumoxy-1-isocyano-2-phenylethane-1-carboxylic acid or a derivative thereof.

Other metallized isocyanides may be prepared in an analogous manner from, for example, $CH_3$—NC
$C_6H_5$—$CH_2$—NC
$C_6H_5$—$CH(CH_3)$—NC
$(C_6H_5)_2CH$—NC

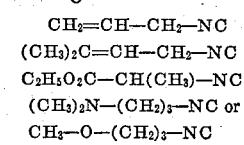

$CH_2$=CH—$CH_2$—NC
$(CH_3)_2C$=CH—$CH_2$—NC
$C_2H_5O_2C$—$CH(CH_3)$—NC
$(CH_3)_2N$—$(CH_2)_3$—NC or
$CH_3$—O—$(CH_2)_3$—NC using butyllithium, phenyllithium, sodium hydride, sodium acetylide, sodium ethylate or potassium tert-butylate. Instead of by isolation of the metallized isocyanide, metallization can be detected by direct further reaction with a carbonyl compound to form an oxazoline or olefin.

A solution of 5.6 ml. methylisocyanide (0.1 mole) in 20 ml. absolute tetrahydrofuran is dripped at —70° C. under nitrogen into 66 ml. n-butyllithium (0.105 mole, 1.6N in hexane) in 100 ml. absolute tetrahydrofuran. After 10 minutes a solution of 12.0 g. (0.1 mole) acetophenone in 20 ml. absolute tetrahydrofuran is added and after another 10 minutes 25 ml. methanol is run in. The whole is stirred at room temperature for two hours, the solvent is removed in vacuo and the residue distributed between ether and water. Distillation of the ethereal solution yields 12.8 g. 5-methyl-5-phenyl-2-oxazoline, b.p. 70° (0.1 mm.). The yield is 80%.

| Example number | Isocyanide | Carbonyl compound | 2-oxazoline | Yield, percent |
|---|---|---|---|---|
| 6 | Benzyl | Cyclohexanone | Cyclohexanespiro-5'-(4'-phenyl) | 26 |
| 7 | Benzhydryl | do | Cyclohexanespiro-5'-(4',4'-diphenyl) | 72 |
| 8 | Allyl | do | Cyclohexanespiro-5'-(4'-vinyl) | 13 |
| 9 | 3,3-dimethylallyl | Acetophenone | 4-(2',2'-dimethylvinyl)-5-phenyl-5-methyl | 46 |
| 10 | Furfuryl | do | α-Methyl-β-(2-furyl)-styrene | 18 |

The formation of metallized isocyanide can also be proved by deuteration.

EXAMPLE 11

44 ml. phenyllithium (55 mmoles; 1.25N in ether) is dripped at —70° C. under nitrogen into a solution of 6.5 g. (50 mmoles) α-phenylethyl isocyanide in 50 ml. absolute tetrahydrofuran. Metallization is indicated by green coloration of the solution. After 10 minutes a solution of 2 ml. deuterium oxide in 10 ml. tetrahydrofuran is added at the same temperature, the mixture being decolorized again. Hydrolysis is effected with concentrated common salt solution and the organic phase is separated, dried and distilled. 5.8 g. α-deutero-α-phenylethyl isocyanide is obtained in a yield of 89%. The deuterium content is determined by NMR and mass spectrometric methods (95%). The position of the deuterium clearly appears from the NMR spectrum.

| Example number | Isocyanide | Base | Reaction temperature, °C. | Product |
|---|---|---|---|---|
| 12 | 3-dimethylaminopropyl | Butyllithium | —70 | 1-mono-deutero-. |
| 13 | 3-methoxypropyl | do | (¹) | Do. |

¹ Approximately 0° C.

The invention thus contemplates inter alia the reaction of metallized isocyanides of a compound having the general formula

R¹—N=C where R¹ is alkyl having 1 to 5 carbon atoms; vinyl, allyl, methallyl, 3,3 - dimethylallyl, crotyl, pentadien - 2,4-yl, ethynyl methyl, cyclopropyl, cyclopentyl, cyclohexyl, phenylalkyl wherein the alkylene chain has 1 to 3 carbon atoms, ethoxymethyl, $CH_3$—O—$(CH_2)_3$—, phenoxymethyl, ethylmercaptomethyl, phenylmercaptomethyl, dimethylaminomethyl; or $(CH_3)_2N$—$(CH_2)_3$—, ethoxycarbonylmethyl, $C_2H_5OOC$—$CH(CH_3)$—, tributoxyacetyl, ethoxycarbonylethyl, acetylmethyl, benzoylmethyl, nitrilomethyl, furfuryl, benzhydryl, pyridyl, or $CH_3$—$CH_2CH$=$CH$— and said group R¹ having a hydrogen atom on its alpha carbon atom replaced by an atom of lithium, sodium or potassium or by an equivalent of magnesium.

We claim:
1. A process for producing Δ²-oxazolines which comprises reacting at a temperature between —80° C. and +80° C.

(A) a compound of the formula

R¹—N=C where R¹ is alkyl having 1 to 5 carbon atoms, vinyl, allyl, methallyl, 3,3-dimethylallyl, crotyl, pentadien-2,4-yl, ethynyl methyl, cyclopropyl, cyclopentyl, cyclohexyl, phenylalkyl wherein the alkylene chain has 1 to 3 carbon atoms, ethoxymethyl, pyridyl, $CH_3$—O—$(CH_2)_3$—, phenoxymethyl, ethylmercaptomethyl, phenylmercaptomethyl, dimethylaminomethyl; or $(CH_3)_2N$—$(CH_2)_3$—, alkoxycarbonylmethyl, $C_2H_5OOC$—$CH(CH_3)$—, tributoxyacetyl, alkoxycarbonylethyl, acetylmethyl, benzoylmethyl, nitrilomethyl, furfuryl, benzhydryl, or $CH_3$—$CH_2CH$=$CH$— and said group R¹ having a hydrogen atom on its alpha carbon atom replaced by an atom of lithium, sodium or potassium or by an equivalent of magnesium, zinc or cadmium (B) with cyclohexanone or an aldehyde or ketone of the formula

wherein R³ and R⁴ denote alkyl, alkenyl, cyclohexyl, cyclooctyl, cyclohexenyl, phenyl, phenylalkyl, phenylalkenyl, or alkylphenyl, and R³ may further be hydrogen, with interaction of a protonating agent replacing Me by H, said temperature being one in which the produced Δ²-oxazoline is stable.

2. A process as claimed in claim 1 wherein compound (B) is cyclohexanone.

3. A process as claimed in claim 1 wherein compound (B) is cinnamaldehyde.

4. A process as claimed in claim 1 wherein compound (B) is acetophenone.

5. A process as claimed in claim 1 wherein said α-metallized isocyanide is an α-metallized benzylisocyanide.

6. A process as claimed in claim 1 wherein said α-metallized isocyanide is α-metallized benzhydrylisocyanide.

7. A process as claimed in claim 1 wherein said α-metallized isocyanide is an α-metallized allylisocyanide.

8. A process as claimed in claim 1 wherein said α-metallized isocyanide is α-metallized 3,3-dimethylallylisocyanide.

9. A process as claimed in claim 1 wherein said α-metallized isocyanide is α-metallized furfurylisocyanide.

10. A process as claimed in claim 1 wherein said α-metallized isocyanide is α-metallized methylisocyanide.

11. A process as claimed in claim 1 wherein said protonating agent is water, an alkanol, a phenol, an organic acid, an inorganic acid, a primary amine, a secondary amine, ammonia, a thioalcohol, a thiocarboxylic acid or a CH— acid compound.

12. A process as claimed in claim 1 wherein said protonating agent is water, methyl alcohol, ethyl alcohol, propyl alcohol, isopropyl alcohol, phenol, formic acid, or acetic acid.

13. A process for production of 5-styryl-$\Delta^2$-oxazoline which comprises reacting in the temperature range of $-80°$ C. and $+80°$ C., at which temperature the produced 5-styryl-$\Delta^2$-oxazoline is stable, isocyanomethyllithium and cinnamaldehyde in the presence of a protonating agent which replaces Li by H.

14. A process for the production of $\Delta^2$-oxazolines which comprises reacting a compound of the formula

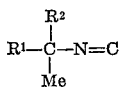

with a carbonyl compound of the formula

in the temperature range of $-80°$ C. and $+80°$ C. and in the presence of a protonating agent selected from the group consisting of water, water-soluble alcohols, phenols, water-soluble organic acids, primary and secondary amines, and aqueous inorganic acids, and recovering the oxazoline, in which formulae $R^1$ is hydrogen, a carboxylic acid alkyl ester group or phenyl, $R^2$ is hydrogen, $R^3$ is phenyl or phenylvinyl, and $R^4$ is phenyl, methyl or hydrogen, and Me is sodium, potassium or lithium or an equivalent of magnesium, cadmium or zinc.

15. A process as claimed in claim 1 wherein Me is lithium, sodium or potassium.

References Cited

UNITED STATES PATENTS 3,712,911   1/1973   Schoellkopf et al. ____ 260—464

OTHER REFERENCES

Hesse et al.: Angew. Chem., Internat. Edit., vol. 4, 596 (1965).

Buechne et al.: Chemical Abstracts, vol. 65, col. 3681 (1966).

Gerhart et al.: Tetrahedron Letters, No. 59, pp. 6231–6234 (1968).

JOHN D. RANDOLPH, Primary Examiner

U.S. Cl. X.R.

260—307 F